(12) United States Patent
Narayanaswamy et al.

(10) Patent No.: US 11,929,086 B2
(45) Date of Patent: Mar. 12, 2024

(54) SYSTEMS AND METHODS FOR AUDIO SOURCE SEPARATION VIA MULTI-SCALE FEATURE LEARNING

(71) Applicants: Vivek Sivaraman Narayanaswamy, Tempe, AZ (US); Andreas Spanias, Tempe, AZ (US); Jayaraman Thiagarajan, Dublin, CA (US); Sameeksha Katoch, Tempe, AZ (US)

(72) Inventors: Vivek Sivaraman Narayanaswamy, Tempe, AZ (US); Andreas Spanias, Tempe, AZ (US); Jayaraman Thiagarajan, Dublin, CA (US); Sameeksha Katoch, Tempe, AZ (US)

(73) Assignees: Arizona Board of Regents on Behalf of Arizona State University, Tempe, AZ (US); Lawrence Livermore National Security, LLC, Livermore, CA (US)

( * ) Notice: Subject to any disclaimer, the term of this patent is extended or adjusted under 35 U.S.C. 154(b) by 471 days.

(21) Appl. No.: 17/121,131

(22) Filed: Dec. 14, 2020

(65) Prior Publication Data
US 2021/0183401 A1 Jun. 17, 2021

Related U.S. Application Data

(60) Provisional application No. 62/947,871, filed on Dec. 13, 2019.

(51) Int. Cl.
*G10L 21/0308* (2013.01)
*G06F 16/635* (2019.01)
*G06N 3/04* (2023.01)
*G06N 3/08* (2023.01)
*G10L 25/30* (2013.01)

(52) U.S. Cl.
CPC ........ *G10L 21/0308* (2013.01); *G06F 16/635* (2019.01); *G06N 3/04* (2013.01); *G06N 3/08* (2013.01); *G10L 25/30* (2013.01)

(58) Field of Classification Search
None
See application file for complete search history.

(56) References Cited

U.S. PATENT DOCUMENTS

| | | |
|---|---|---|
| 8,392,198 B1 | 3/2013 | Berisha et al. |
| 9,055,374 B2 | 6/2015 | Krishnamoorthi et al. |
| 9,461,676 B2 | 10/2016 | Santucci et al. |
| 9,507,011 B2 | 11/2016 | Zhang et al. |
| 10,013,992 B2 | 7/2018 | Spanias et al. |
| 10,440,553 B2 | 10/2019 | Zhang et al. |
| 2019/0066713 A1* | 2/2019 | Mesgarani ............ G10L 17/26 |
| 2019/0108444 A1 | 4/2019 | Song et al. |

(Continued)

OTHER PUBLICATIONS

Andrew L. Maas et al., Rectifier Nonlinearities Improve Neural Network Acoustic Models, Proc. Of the 30th Int'l Conf. on Machine Learning (Atlanta, Georgia, USA, 2013) (available at http://ai.stanford.edu/~amaas/papers/relu_hybrid_icml2013_final.pdf) (last accessed Mar. 22, 2023) (Year: 2013).*

(Continued)

*Primary Examiner* — Walter F Briney, III
(74) *Attorney, Agent, or Firm* — POLSINELLI PC

(57) ABSTRACT

Various embodiments of a system and methods for audio source separation via multi-scale feature learning are disclosed.

18 Claims, 6 Drawing Sheets

(56) References Cited

U.S. PATENT DOCUMENTS

| | | |
|---|---|---|
| 2020/0043508 A1 | 2/2020 | Song et al. |
| 2020/0226471 A1 | 7/2020 | Shanthamallu et al. |
| 2020/0226472 A1 | 7/2020 | Shanthamallu et al. |
| 2020/0274484 A1 | 8/2020 | Narayanaswamy et al. |
| 2020/0358396 A1 | 11/2020 | Rao et al. |
| 2021/0120355 A1* | 4/2021 | Kim .................. H04S 5/00 |

OTHER PUBLICATIONS

Jaoson Brownlee, How to Fix the Vanishing Gradients Problem Using the ReLU (https://machinelearningmastery.com/how-to-fix-vanishing-gradients-using-the-rectified-linear-activation-function/) (published Jan. 11, 2019) (archived Apr. 17, 2019) (last accessed Mar. 22, 2023) (Year: 2019).*

Spanias, et al., Audio signal processing and coding. John Wiley & Sons, 2006.

Févotte, et al., Bss eval toolbox user guide-revision 2.0, 2005.

Grais, et al., Raw multi-channel audio source separation using multi-resolution convolutional auto-encoders, 2018 26th European Signal Processing Conference (EUSIPCO). IEEE, 2018, pp. 1577-1581.

Huang, et al., Densely connected convolutional networks, Proceedings of the IEEE conference on computer vision and pattern recognition, pp. 4700-4708, 2017.

Jansson, et al., Singing voice separation with deep u-net convolutional networks, 18th International Society for Music Information Retrieval Conference, Oct. 2017.

Liutkus, et al., Scalable audio separation with light kernel additive modelling, IEEE International Conference on Acoustics, Speech and Signal Processing (ICASSP), pp. 76-80, 2015.

Liutkus, et al., The 2016 signal separation evaluation campaign, International Conference on Latent Variable Analysis and Signal Separation, pp. 323-332, Springer, 2017.

Lluis, et al., End-to-end music source separation: is it possible in the waveform domain?, arXiv preprint arXiv:1810.12187, 2018.

Luo, et al., Tasnet: time-domain audio separation network for real-time, single-channel speech separation, 2018 IEEE International Conference on Acoustics, Speech and Signal Processing (ICASSP), pp. 696-700, 2018.

Luo, et al., Conv-tasnet: Surpassing ideal time-frequency magnitude masking for speech separation, IEEE/ACM Transactions on Audio, Speech, and Language Processing, vol. 27, No. 8, pp. 1256-1266, 2019.

Luo, et al., Deep clustering and conventional networks for music separation: Stronger together, IEEE International Conference on Acoustics, Speech and Signal Processing (ICASSP), pp. 61-65, 2017.

Makino, et al., Audio source separation based on independent component analysis, 2004 IEEE International Symposium on Circuits and Systems (IEEE Cat. No. 04CH37512), vol. 5, pp. V-V, May 2004.

Pascual, et al., Segan: Speech enhancement generative adversarial network, arXiv preprint arXiv:1703.09452, 2017.

Rafii, et al., The MUSDB18 corpus for music separation, Dec. 2017. [Online]. Available: https://doi.org/10.5281/zenodo.1117372.

Stoller, et al., Wave-u-net: A scale neural network for end-to-end audio source separation, arXiv preprint arXiv:1806.03185, 2018.

Takahashi, Mmdenselstm: An efficient combination of convolutional and recurrent neural networks for audio source separation, 2018 16th IEEE International Workshop on Acoustic Signal Enhancement (IWAENC), pp. 106-110, 2018.

Thiagarajan, et al., Mixing matrix estimation using discriminative clustering for blind source separation, Digital Signal Processing, vol. 23, No. 1, pp. 9-18, 2013.

Uhlich, et al., Improving music source separation based on deep neural networks through data augmentation and network blending, IEEE International Conference on Acoustics, Speech and Signal Processing (ICASSP), pp. 261-265, 2017.

Ulyanov, et al., Deep image prior, Proceedings of the IEEE Conference on Computer Vision and Pattern Recognition, pp. 9446-9454, 2018.

Van den Oord, et al., Wavenet: A generative model for raw audio, arXiv preprint arXiv:1609.03499, 2016.

Vincent, et al., Performance measurement in blind audio source separation, IEEE Transactions on Audio, Speech, and Language Processing, vol. 14, No. 4, pp. 1462-1469, Jul. 2006.

* cited by examiner

SYSTEMS AND METHODS FOR AUDIO SOURCE SEPARATION VIA MULTI-SCALE FEATURE LEARNING

CROSS-REFERENCE TO RELATED APPLICATIONS

This is a non-provisional application that claims benefit to U.S. provisional application Ser. No. 62/947,871 filed on Dec. 13, 2019, which is herein incorporated by reference in its entirety

FIELD

The present disclosure generally relates to audio source separation techniques, and in particular to audio source separation via multi-scale feature learning.

BACKGROUND

Audio source separation refers to the process of extracting constituent sources from a given audio mixture. Despite being a critical component of audio enhancement and retrieval systems, the task of source separation is severely challenged by variabilities in acoustic conditions and the highly ill-posed nature of this inverse problem. While classical regularized optimization techniques such as independent component analysis (ICA) and matrix factorization have been widely adopted, more recent solutions have increasingly relied on deep neural networks, which have been found to be effective at solving several ill-conditioned inverse tasks in computer vision. The modus operandi in this context is to adopt an encoder-decoder style architecture, powered by convolutional or generative adversarial networks, for end-to-end optimization of the inversion process.

A majority of conventional source separation techniques operate in the spectral domain, most often based on the magnitude spectrum. However, by ignoring the crucial phase information, these methods often require extensive tuning of front-end spectral transformations to produce accurate source estimates. Consequently, recent approaches have resorted to time-domain processing, thus entirely dispensing the need for front-end spectral transformations. On the other hand, fully time-domain approaches necessitate the need to deal with variable temporal contexts to extract useful features, thus making network training challenging even with sophisticated sequence models such as LSTMs and 1D-CNNs. This naturally motivates the design of architectures that can effectively extract multi-scale features and can produce generalizable source estimation models even for highly underdetermined scenarios.

There exists a large body of prior work for source separation using time-frequency representations typically, short-time Fourier transforms (STFTs). While some have operated with spatial covariance matrices for source separation in the STFT domain, others have used the magnitude spectrogram as the representation for a mixture and its constituent sources. Due to inherent challenges in phase spectrum modification, much of the existing literature has focused on the magnitude spectrum, while including an additional step for incorporating the phase information, which often leads to inaccurate determination of source signals. Furthermore, with low-latency systems, large window lengths are needed for effective separation in the STFT domain.

A widely-adopted idea to address these limitations is to entirely dispense the spectral transformation step and operate in the time-domain directly. Popular instantiations of this idea include the MultiResolution Convolutional Auto-Encoder (MRCAE), TasNet, Conv-TasNet, the Wave-U-Net and the WaveNet based models. MRCAE is an autoencoder-style architecture comprised of multiple convolution and transposed convolution layers, akin to capturing audio frequencies with multi-scale resolutions. A crucial limitation of this approach is its inability to deal with long sequences—results reported were with 1024-sample sequences, which is often insufficient to model complex dependencies at high sampling rates. TasNet has been developed, which uses an autoencoder-style model to represent an audio mixture as a weighted sum of basis signals, wherein the estimated weights indicate the contribution of each source signal and the filters from the decoder form the basis set. However, the model is customized for speech separation with emphasis on low latency scenarios.

Another important class of separation techniques are based on utilizing 1D convolutions at multiple temporal scales. For example, the WaveNet model extended the WaveNet architecture, popularly utilized for audio synthesis, for the source separation task. Though this approach supports multi-scale feature learning, its performance relies on using additional temporal context to predict a short segment of the audio. The recent Wave-U-Net model directly uses the U-Net architecture from the dense segmentation literature and produces high-quality source estimates, even without the need for fine-grained inferencing.

It is with these observations in mind, among others, that various aspects of the present disclosure were conceived and developed.

BRIEF DESCRIPTION OF THE FIGURES

Corresponding reference characters indicate corresponding elements among the view of the drawings. The headings used in the figures do not limit the scope of the claims.

DETAILED DESCRIPTION

Various embodiments of a fully convolutional system for audio source separation that leverages a U-Net style convolutional neural network (CNN) architecture, referred to herein as DDU-Net, coupled with novel strategies for reliable multi-scale feature extraction and audio source separation of audio data, are described herein. By using a U-Net style CNN architecture including an upstream block of convolutions and a downstream block of convolutions at different scales, concise multi-scale representations for mixture signals and constituent source estimates are jointly inferred, where a number of sources and a mixing process are assumed to be known a priori. Though multi-scale feature learning of audio data can be carried out using simple downsampling in the downstream path and appropriate upsampling in the upstream path of an U-Net, it is shown that it is more effective to utilize dilated convolutions, coupled with adaptive dilation, to model temporal dependencies in audio data. More importantly, this process can avoid the need for specific resampling strategies to combat aliasing artifacts that can arise during upsampling. Furthermore, in order to support sophisticated dependency modeling and to facilitate better gradient flow in deep networks with multi-scale features, the present system uses dense connections within each convolutional block to support information flow between downstream and upstream paths.

Using the publicly available MUSDB18 and CCMixter datasets, the performance of DDU-Net for audio source separation is investigated. Through ablation studies, the importance of both adaptive dilation in multi-scale feature learning, and the usefulness of dense dependency modeling as the network depth increases is clearly demonstrated. The experiments in the present disclosure show that the proposed approach, which combines both adaptive dilation and dense connections, significantly outperforms the state-of-the-art time domain audio separation baselines, namely the Wave-U-Net and WaveNet.

The contributions of the present disclosure can thus be summarized as follows:
- A U-Net style fully convolutional architecture 100, DDU-Net, for underdetermined audio source separation.
- A multi-scale feature extraction strategy based on 1D dilated convolutions coupled with adaptive dilation.
- A dense architecture to enable sophisticated dependency modeling during multi-scale feature learning, and to support improved gradient flow with deeper networks.
- Empirical validation on challenging benchmarks and demonstration of performance improvements over state-of-the-art source separation methods, Wave-U-Net and WaveNet.

Figure 1:
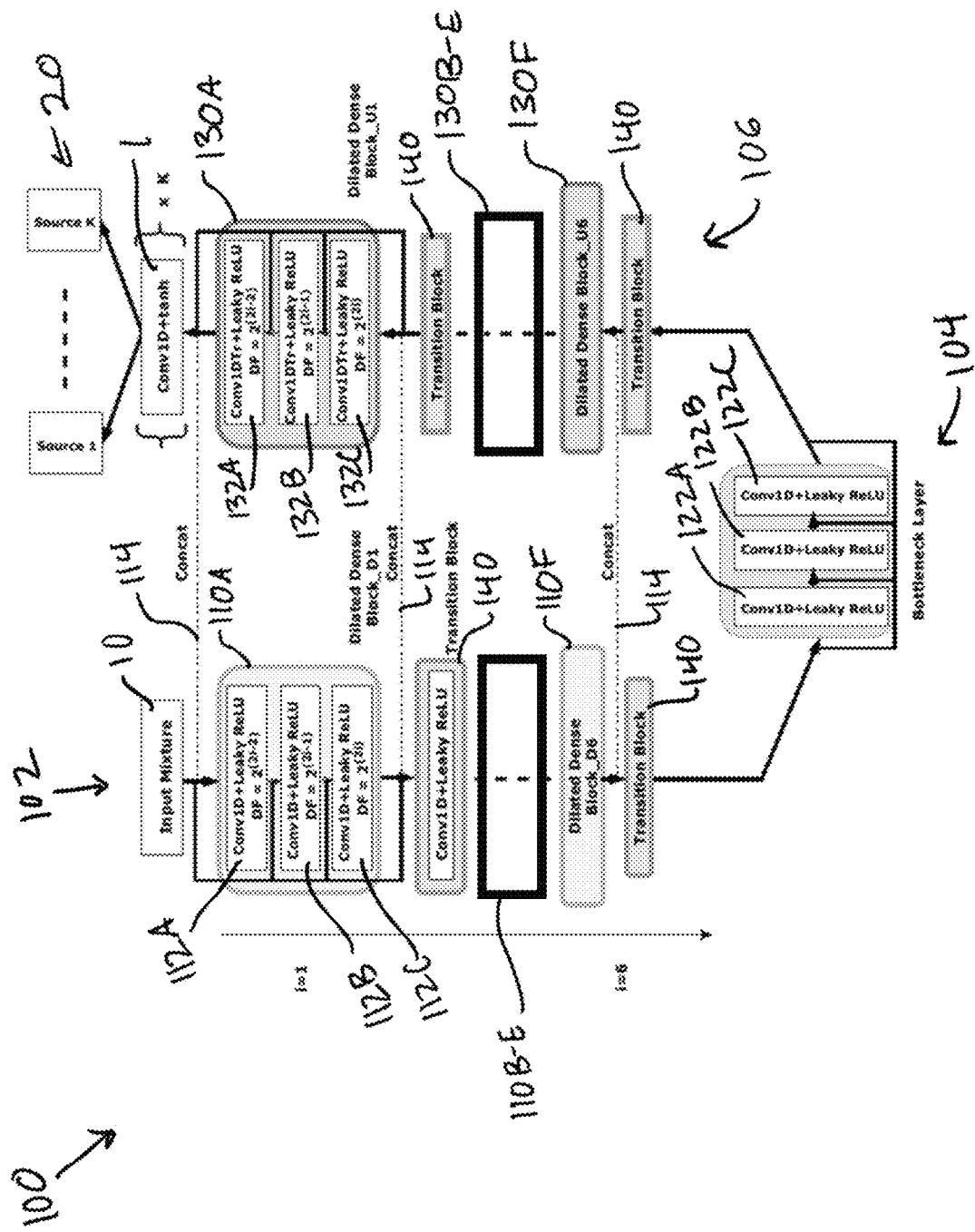
FIG. 1 is a simplified illustration showing a set of convolutional blocks representative of a system for audio source separation.

The task of audio source separation involves separating a given mixture waveform $M \in \mathbb{R}^{L_m \times C}$ into K constituent source waveforms $[S_1, \ldots S_K]$, where each $S_i \in \mathbb{R}^{L_n \times C}$. Here, $L_m$ and $L_n$ denote the lengths of the mixture and the sources respectively, and C represents the number of channels. In our formulation, $L_m = L_n$, C=2 is considered, implying stereo and the mixing process to be an unweighted sum of source signals. FIG. 1 provides an illustration of the architecture 100 for audio source separation. In the rest of this section, details are provided.

A. Improved Multi-Scale Feature Learning

As discussed, the performance of source separation approaches that operate directly in the time-domain rely heavily on the quality of the feature extraction process. In particular, building a generalizable model requires the ability to model a wide range of temporal dependencies, which in turn requires effective multi-scale feature extraction. Hence, the present architecture 100 employs dilated convolutions to seamlessly incorporate multi-scale features, thereby dispensing the need for explicit resampling techniques for reliable source estimation.

As illustrated in FIG. 1, a U-Net style architecture 100 is utilized, which includes a downstream path 102 in communication with a bottleneck path 104 that communicates with an upstream path 106. Downstream path 102 takes an input mixture 10, and upstream path 106 outputs K constituent source waveforms 20 separated from the input mixture 10. The downstream path 102 includes six convolutional blocks 110, and each convolutional block 110 in turn includes three dilated convolution layers 112. Within each convolutional block 110, a number of convolution filters for each layer in each convolutional block 110 is set to 15×i, where i=1 . . . 6 indicates a block index. In the diagram of FIG. 1, the first convolutional block 110A (Dilated Dense Block D1; i=1) is shown with three dilated convolution layers 112A-C. Subsequent blocks 110B-E are condensed for simplicity but follow the structure as discussed above with respect to block indices i=2 . . . 5, and the final convolutional block 110F (Dilated Dense Block D6; i=6) is shown at the end of the downstream path 102.

Furthermore, in order to enable multi-scale feature extraction from the audio data of input mixture 10, a dilation rate associated with each layer is increased exponentially by a factor of 2. While the dilation rate is fixed at 1 for the first convolutional layer 112A in the first convolutional block 110A, in the subsequent blocks 110B-E, the dilation rate of the first layer 112 in each convolutional block 110 was set to be the same as the last layer of the preceding convolutional block 110. In this process, feature extraction with dilation rates ranging between 1 and 4096 is enabled, thus allowing a principled inference of multi-scale features from an audio excerpt. It must be noted that, all layers 112 perform convolutions of stride 1 with same padding.

Correspondingly, the upstream path 106 includes 6 convolutional blocks 130A-F of transposed dilated convolutions; the configurations were chosen to be symmetrical to the downstream path 102. The bottleneck path 104 between downstream and upstream paths 102 and 106 includes three 1D convolution layers of 15 filters each, with dilation rates set to 1. In addition, concatenated skip connections 114 are included between each corresponding convolutional block 110 and 130 in the downstream and upstream paths 102 and 106. A final source estimation layer 108 processes the output from the upstream path using K, 1-D convolutional neural network (CNN) layers with a hyperbolic tangent activation function to estimate the sources. Since training is carried out in a supervisory fashion, a loss function for training is an aggregation of mean squared error (MSE) with respect to each of the constituent sources. In addition, an energy conservation constraint is imposed by explicitly estimating only K−1 sources and approximating the Kth source as the difference between the input mixture and the sum of estimates for K−1 sources.

B. Enabling Reliable Training Via Dense Connections

While the dilated convolutional architecture 100 described earlier enables seamless incorporation of multi-scale features, with increasing depths in the downstream and upstream paths 102 and 106, training of the network of architecture 100 is quite challenging, particularly in underdetermined inverse problems such as audio source separation. The training process may be improved by employing dense connections in the architecture 100 that encourage feature reuse and provide useful gradient information even at increasing layer depths. Each dilated convolution block 110 and 130 in the downstream and upstream paths 102 and 106, include dense connections between each layer of the three layers 112 and 132 in each convolutional block 110 and 130. More specifically, within every dense convolutional block 110 and 130, feature maps produced by each layer 112 and 132 are concatenated to the subsequent layers in the convolutional block 110 and 130. This can however lead to a large number of feature maps which may be computationally infeasible to process as the number of blocks increase. In order to control the growth of the number of feature maps, a transition block 140 may be included at an output of each convolutional block 110 in the downstream path 102 and at an input of each convolutional block 130 in the upstream path. In some embodiments, transition blocks 140 are implemented using 1-D CNNs, which reduce a size of an output at the end of each dilated dense convolutional block 110 and 130. Efficiency of feature extraction is further enhanced by using skip-connected dense features enabled by concatenated skip connections 114 between the corresponding downstream convolutional blocks 110 and upstream convolutional blocks 130. In essence, the present architecture 100 is a fully convolutional architecture for reliably inferring multi-scale audio features in order to predict constituent sources from observed mixtures.

Experiments

The present architecture 100 was evaluated on two audio source separation tasks, namely multi-instrument and singing voice separation, on the publicly available MUSDB18 dataset. For benchmarking, comparisons to the state-of-the-art Wave-U-Net and the WaveNet based baselines are presented. In addition, an ablation study was included on the multi-instrument dataset to illustrate the impact of different design choices on the performance of DDU-Net.

Experimental Setup: For the task of multi-instrument separation, the MUSDB18 dataset, which includes 150 tracks in total, is used—and within that dataset 75 randomly chosen tracks are used for training, 25 for validation and 50 for testing. The dataset contains multi-stream files of the mixtures and the constituent sources, namely bass, drums, vocals and other. Following standard practice with this dataset, the audio streams are resampled to 22050 Hz. In the experimental setup, segments of 16, 384 samples each (~1 sec) are used and a simple (unweighted) additive mixing process is adopted. In order to improve the training process, data augmentation is performed wherein the source signals are scaled using a randomly chosen factor in the interval [0.7, 1] and appended to the original dataset. In the task of singing voice separation, the goal is to separate the vocals from the rest, and in this experiment the augmented MUSDB18 dataset is expanded further with the CCMixter dataset. All models reported in the paper were trained using the Adam optimizer with learning rate 0.0001 and batch size 16. For performance evaluation, the signal-to-distortion ratio (SDR) was measured for each of the estimated sources which takes into account the noise arising from interference and other artifacts in the estimates. In the experiments, the mean and median SDR were computed using the bsseval toolbox.

Impact of Design Choices

Figure 2:
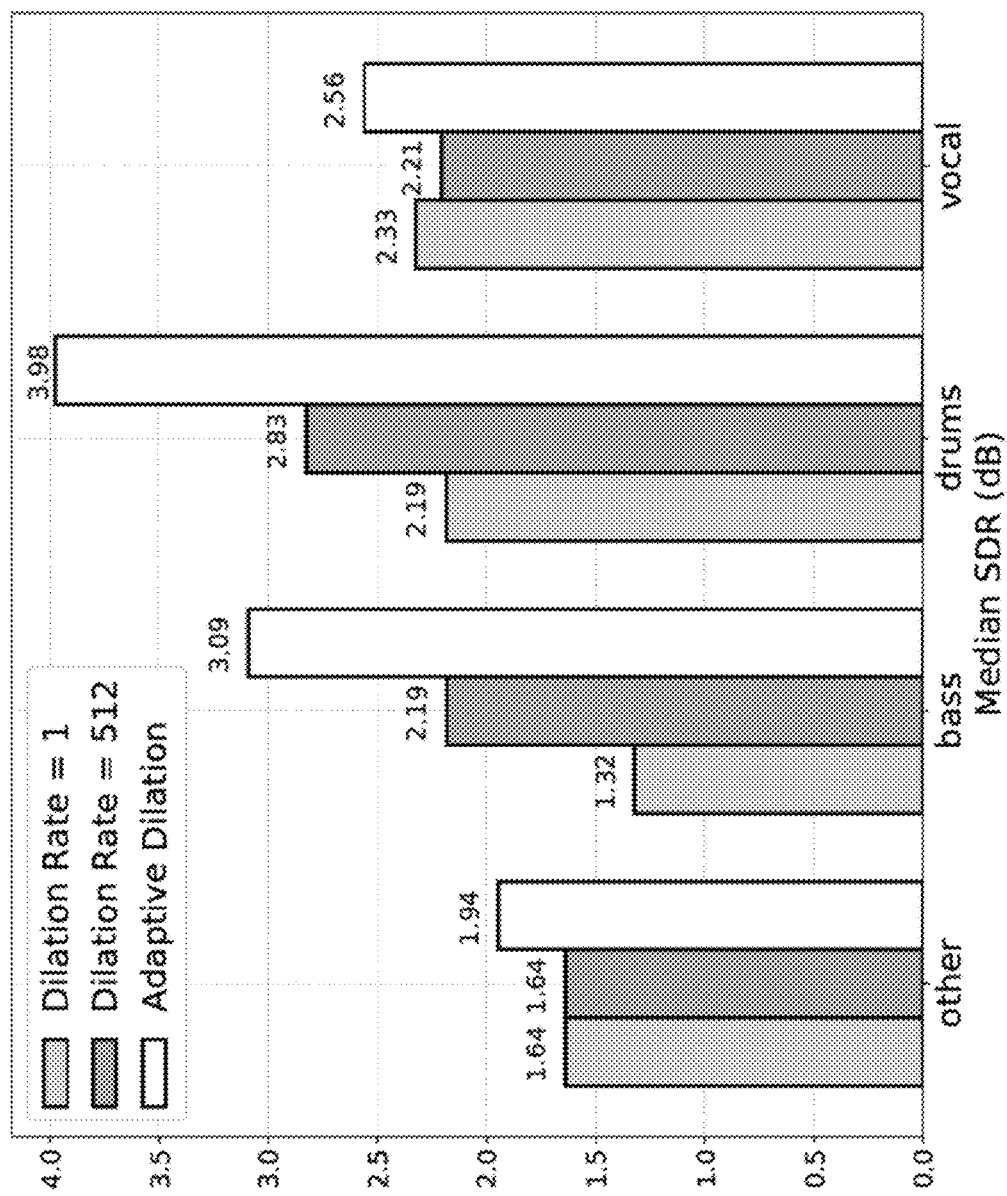
FIG. 2 is a graphical representation showing an impact of a choice of dilation rates in different layers of the system of FIG. 1.
Figure 3:
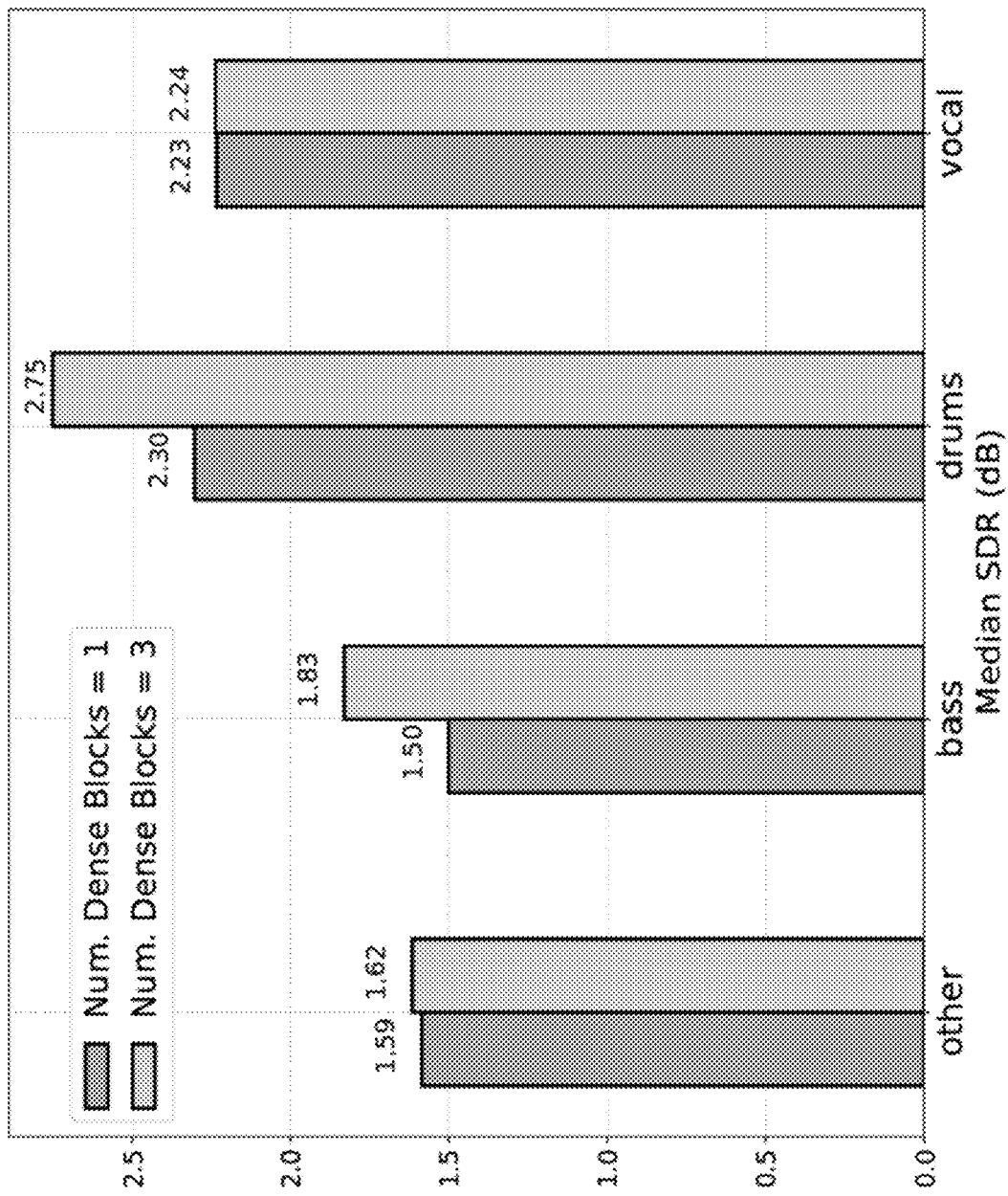
FIG. 3 is a graphical representation showing the impact of the use of dense connections as the depth of the architecture of the system of FIG. 1 increases.

Ablation studies were performed to demonstrate the impact of different design choices on the behavior of the present architecture 100. First, the impact of different dilation schemes are shown, particularly when dense connections were not utilized. In its simplest form, the dilation rate is fixed at 1 for all six convolutional blocks, which corresponds to standard 1-D convolutions. In addition, two more cases are considered: dilation rate fixed at a constant value of 512 for all layers and the proposed adaptive dilation scheme as discussed herein. The sub-optimal performance of standard 1-D convolutions as depicted in FIG. 2 clearly shows the importance of leveraging larger temporal contexts. More importantly, the proposed adaptive dilation scheme provides a significant performance boost compared to using fixed dilation in all layers, thus emphasizing the need for principled multi-scale feature extraction. Next, the impact of using only dense connections without adaptive dilation on the separation performance is analyzed. For this experiment, the dilation rate is fixed at a constant value of 512 and a number of DDU-Net block are fixed at 1 and 3 respectively. It is evident from FIG. 3 that, as the depth of the network increases, dense connections provide significant gains. This demonstrates the benefits of more expressive modeling of dependencies both within the convolution blocks, as well as between downstream and upstream paths.

Performance Evaluation

Figure 4A:
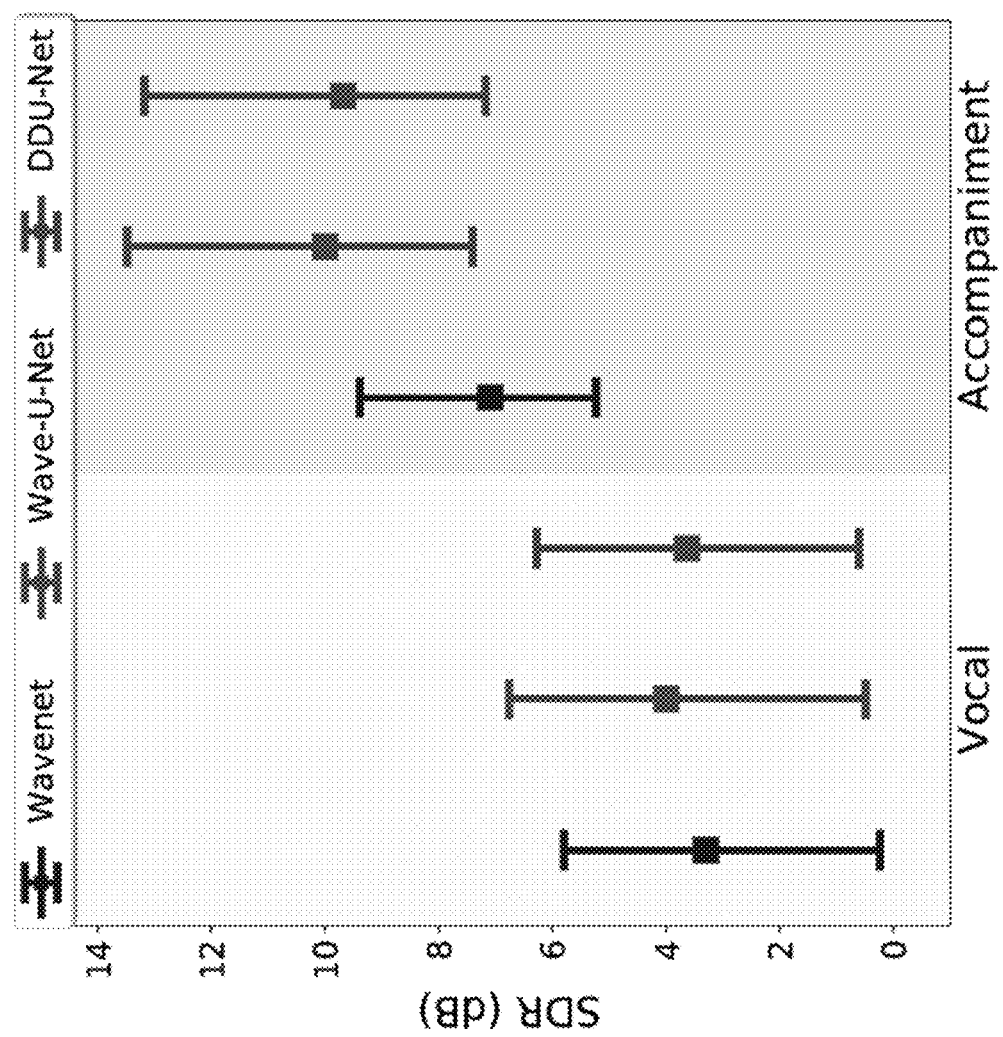
FIGS. 4A and 4B are graphical comparisons showing performance of the system of FIG. 1 against existing models.
Figure 4B:
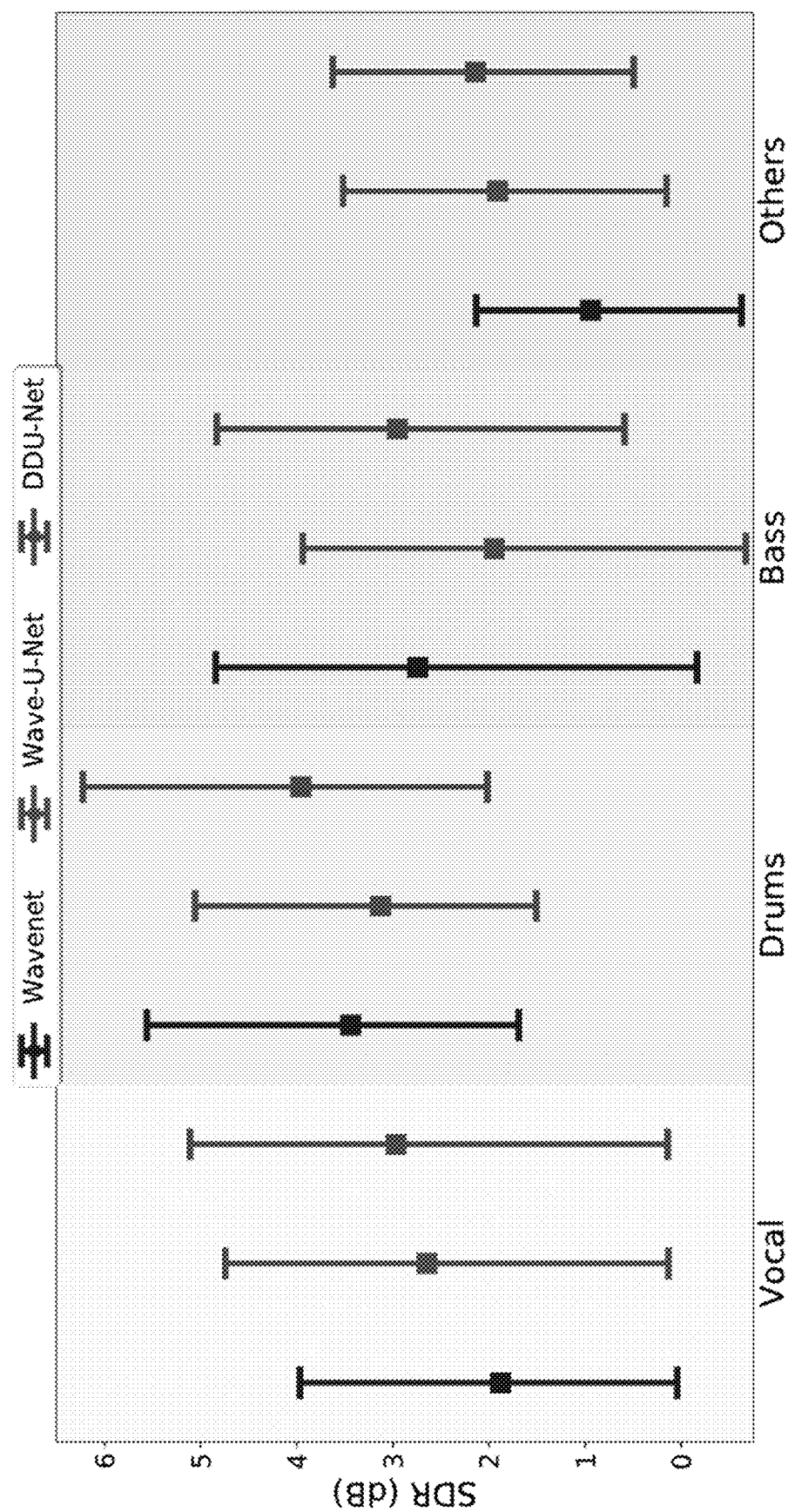

The performance of the present architecture 100 on the MUSDB18 test dataset is evaluated for multi-instrument as well as singing voice separation tasks. In addition, the performance is compared against the state-of-the-art Wave-U-Net and WaveNet models. FIG. 4A compares the SDRs for each of the constituent sources in the MUSDB18 test set for the case of singing voice separation. In particular, the median, along with the 25th and 75th percentiles (errorbars), of the SDRs across all audio segments in the test set is shown. The state-of-the-art Wave-U-Net and the present architecture 100 are observed to perform similarly in terms of the distribution of SDRs, and outperform the Wavenet model, particularly in the case of recovering the accompaniment source. The effectiveness of the present architecture 100 is more apparent in the challenging multi-instrument source separation task. As observed in FIG. 4B, through the use of a powerful multi-scale feature extraction process, the present architecture 100 provides significant performance improvements over the baselines in all cases. Lower SDR values for the multi-instrument source separation task using existing approaches, trained with similar training conditions as the present architecture 100, indicate their limitations in source inferencing. Interestingly, unlike the inferencing strategy used in previous approaches, this approach does not require the estimation of source signals using additional temporal contexts, but can instead produce high-quality estimates for the entire segment without any additional information. The results clearly evidence the dependence of these complex data-driven solutions for audio processing on the inherent feature extraction mechanism, and the need for improved architecture design.

Conclusions

The present architecture 100 is presented as an effective solution for performing time-domain audio source separation. Designed as a U-Net style architecture, the present architecture 100 uses dilated convolutions to leverage information from exponentially increasing receptive fields and employs dense connections to improve the robustness of the training process. It can be argued that the proposed modeling strategies can produce multi-scale features which are robust to sampling rate changes and can enable complex temporal modeling. As demonstrated by the experiments, through the improved feature extraction process, the present architecture 100 outperforms state-of-the-art time-domain separation approaches, namely the Wave-U-Net and the WaveNet models. Though the results were shown only for underdetermined mixing settings, the present architecture 100 can be expected to be effective even in fully-determined and overdetermined scenarios. Future extensions to this work include relaxing assumptions made in the formulation, e.g. known mixing process and fully labeled datasets, and exploring models that can generalize across different acoustic environments.

Computer-Implemented System

Figure 5:
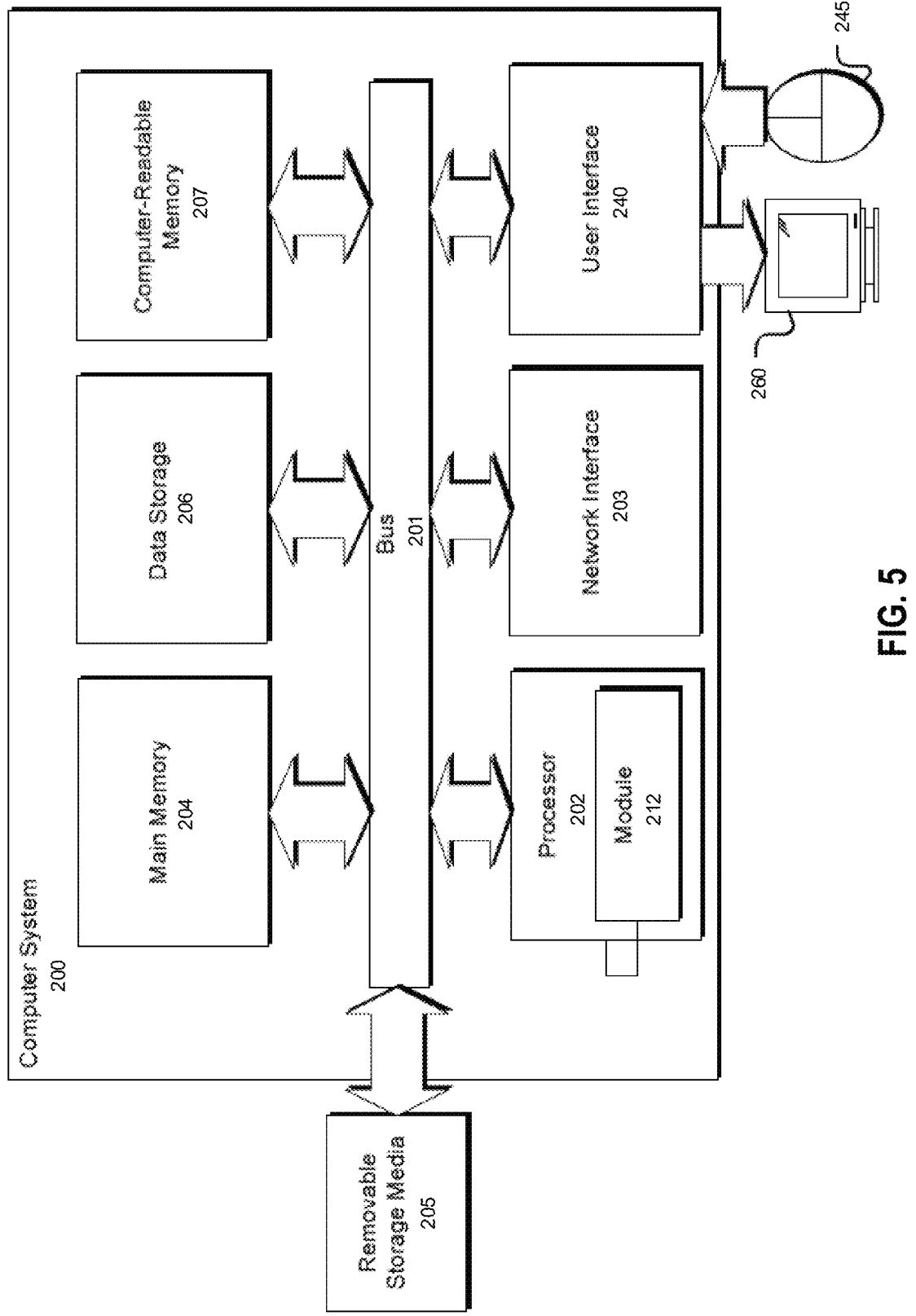
FIG. 5 is a diagram showing an example computing system for execution of the system of FIG. 1.

FIG. 5 illustrates an example of a suitable computing and networking environment (computer system 200) which may be used to implement various aspects of the present disclosure. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of the system application 190 or otherwise, may include a hardware-implemented module and may accordingly configure a processor 202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 200 may be a general purpose computing device 200, although it is contemplated that the networking environment 200 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 200 may include various hardware components, such as a processing unit 202, a main memory 204 (e.g., a memory or a system memory), and a system bus 201 that couples various system components of the general purpose computing device 200 to the processing unit 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 200 may further include a variety of computer-readable media 207 that includes removable/non-removable media and volatile/non-volatile media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device 200 (e.g., during start-up) is typically stored in ROM. RAM typically contains data and/or program modules that are immediately accessible to and/or presently being operated on by processing unit 202. For example, in one embodiment, data storage 206 holds an operating system, application programs, and other program modules and program data.

Data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 or other input devices 245 such as a tablet, electronic digitizer, a microphone, keyboard, and/or pointing device, commonly referred to as mouse, trackball, or touch pad. Other input devices 245 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 245 are often connected to the processing unit 202 through a user interface 240 that is coupled to the system bus 201, but may be connected by other interface and bus structures, such as a parallel port, game port or a universal serial bus (USB). A monitor 260 or other type of display device is also connected to the system bus 201 via user interface 240, such as a video interface. The monitor 260 may also be integrated with a touch-screen panel or the like.

The general purpose computing device 200 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device 200, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
a computer-implemented neural-network based architecture, including:
a downstream path configured to receive an input mixture, the downstream path comprising:
a plurality of downstream convolutional blocks configured to learn a plurality of features of the input mixture, wherein each downstream convolutional block of the plurality of downstream convolutional blocks includes a plurality of downstream convolutional layers having exponentially varying dilation rates associated with each respective upstream convolutional layer of the plurality of downstream convolutional layers;
wherein a first convolutional layer of the first downstream convolutional block directly receives the input mixture; and
an upstream path in communication with the downstream path, the upstream path configured to output a plurality of source waveforms associated with the input mixture, the upstream path comprising:
a plurality of upstream convolutional blocks configured to learn a plurality of features of the input mixture, wherein each upstream convolutional block of the plurality of upstream convolutional blocks includes a plurality of upstream convolutional layers having exponentially varying dilation rates associated with each respective upstream convolutional layer of the plurality of upstream convolutional layers;
the input mixture being connected directly to a final convolutional layer by a skip connection;
wherein the plurality of upstream convolutional blocks are transposed relative to the plurality of downstream convolutional blocks.

2. The system of claim 1, wherein each downstream convolutional layer of the plurality of downstream convolutional layers and each upstream convolutional layer of the plurality of upstream convolutional layers is associated with a respective activation function, wherein each respective activation function is a leaky rectified linear unit (leaky ReLu).

3. The system of claim 1, wherein each downstream convolutional block of the plurality of downstream convolutional blocks is associated with an index value such that a first downstream convolutional block in a sequence of downstream convolutional blocks is associated with a lowest index value and a last downstream convolutional block in the sequence of downstream convolutional blocks is associated with a highest index value.

4. The system of claim 1, wherein each upstream convolutional block of the plurality of upstream convolutional blocks is associated with an index value such that a first upstream convolutional block in a sequence of upstream convolutional blocks is associated with a highest index value and a last upstream convolutional block in the sequence of upstream convolutional blocks is associated with a lowest index value.

5. The system of claim 1, wherein each upstream convolutional layer of the plurality of upstream convolutional layers and each downstream convolutional layer of the plurality of downstream convolutional layers includes a respective plurality of convolution filters, wherein a quantity of convolution filters of the plurality of convolution filters is associated with each upstream convolutional layer of the plurality of upstream convolutional layers and each downstream convolutional layer of the plurality of downstream convolutional layers is dependent upon an index value associated with a corresponding upstream convolutional block or downstream convolutional block.

6. The system of claim 5, wherein the dilation rate is dependent upon the index value.

7. The system of claim 1, wherein each downstream convolutional layer of the plurality of downstream convolutional layers and each upstream convolutional layer of the plurality of upstream convolutional layers includes dense connections between each respective downstream convolutional layer of the plurality of downstream convolutional layers and between each respective upstream convolutional layer of the plurality of upstream convolutional layers.

8. The system of claim 1, wherein each downstream convolutional block of the plurality of downstream convolutional blocks is associated with a corresponding upstream convolutional block of the plurality of upstream convolutional blocks by a respective concatenated skip connection.

9. The system of claim 1, further comprising:
a bottleneck path in communication with the downstream path and the upstream path, wherein the bottleneck path comprises:
a plurality of one-dimensional convolution layers, wherein each one-dimensional convolution layer of the plurality of one-dimensional convolution layers includes a plurality of filters and a dilation rate of 1.

10. The system of claim 1, wherein the upstream path further comprises:
a source estimation layer in communication with the plurality of upstream convolutional blocks, the source estimation layer comprising a plurality of one-dimensional convolutional neural network layers.

11. The system of claim 10, wherein the source estimation layer executes a hyperbolic tangent activation function.

12. The system of claim 1, wherein each downstream convolutional block of the plurality of downstream convolutional blocks and each upstream convolutional block of the plurality of upstream convolutional blocks is associated with a respective transition block.

13. The system of claim 1, the computer-implemented neural-network based architecture being operable for estimating K-1 source waveforms of the plurality of source waveforms and approximating a Kth source waveform as a difference between the input mixture and a summation of the K-1 source waveforms.

14. A method, comprising:
providing a computer-implemented neural-network based architecture, including:
a downstream path configured to receive an input mixture, the downstream path comprising:
a plurality of downstream convolutional blocks configured to learn a plurality of features of the input mixture, wherein each downstream convolutional block of the plurality of downstream convolutional blocks includes a plurality of downstream convolutional layers having exponentially varying dilation rates associated with each respective upstream convolutional layer of the plurality of downstream convolutional layers;
wherein a first convolutional layer of the first downstream convolutional block directly receives the input mixture; and
an upstream path in communication with the downstream path, the upstream path configured to output a plurality of source waveforms associated with the input mixture, the upstream path comprising:
a plurality of upstream convolutional blocks configured to learn a plurality of features of the input mixture, wherein each upstream convolutional block of the plurality of upstream convolutional blocks includes a plurality of upstream convolutional layers having exponentially varying dilation rates associated with each respective upstream convolutional layer of the plurality of upstream convolutional layers;
the input mixture being connected directly to a final convolutional layer by a skip connection;
wherein the plurality of upstream convolutional blocks are transposed relative to the plurality of downstream convolutional blocks; and
providing the computer-implemented neural network based architecture with the input mixture, wherein the input mixture comprises a plurality of audio sources;
inferring a plurality of multi-scale audio features from the input mixture using the computer-implemented neural network based architecture; and
predicting constituent audio sources based on the plurality of inferred multi-scale audio features using the computer-implemented neural network based architecture.

15. The method of claim 14, further comprising:
training the computer-implemented neural network based architecture in a supervised fashion.

16. The method of claim 15, wherein training of the computer-implemented neural network based architecture is improved by employing a plurality of dense connections between each downstream convolutional layer of the plurality of downstream convolutional layers and each upstream convolutional layer of the plurality of upstream convolutional layers such that a plurality of feature maps produced by each downstream convolutional layer and each upstream convolutional layer are concatenated to subsequent downstream convolutional layers and upstream convolutional layers.

17. The method of claim 16, wherein training of the computer-implemented neural network based architecture is improved by employing a plurality of concatenated skip connections between corresponding downstream convolutional blocks and corresponding upstream convolutional blocks of the plurality of downstream convolutional blocks and the plurality of upstream convolutional blocks such that an efficiency of extraction of the plurality of multi-scale audio features from the input mixture is improved.

18. The method of claim 14, the computer-implemented neural-network based architecture being operable for estimating K-1 source waveforms of the plurality of source waveforms and approximating a Kth source waveform as a difference between the input mixture and a summation of the K-1 source waveforms.

\* \* \* \* \*